United States Patent

[11] 3,600,669

[72] Inventor John T. McClain
 Houston, Tex.
[21] Appl. No. 856,046
[22] Filed Sept. 8, 1969
[45] Patented Aug. 17, 1971
[73] Assignee Daniel Industries, Inc,
 Houston, Tex.

[54] METHOD AND APPARATUS FOR LINEARIZING THE SIGNAL OUTPUT OF AN LVDT RESPONSIVE TO NONLINEAR INPUT MOTION
10 Claims, 4 Drawing Figs.
[52] U.S. Cl. ................................................. 323/51,
 340/199
[51] Int. Cl. ....................................................... H01f 21/06
[50] Field of Search ............................................ 323/48, 51;
 340/196, 199

[56] References Cited
UNITED STATES PATENTS

| | | | |
|---|---|---|---|
| 2,570,672 | 10/1951 | Hathaway ..................... | 340/199 X |
| 2,772,383 | 11/1956 | Bradley et al................. | 340/199 X |
| 2,794,971 | 6/1957 | Hornfeck ..................... | 340/196 X |
| 3,143,718 | 8/1964 | Ernest ............................ | 323/51 X |
| 3,181,055 | 4/1965 | Bischof......................... | 323/51 |

Primary Examiner—J. D. Miller
Assistant Examiner—A. D. Pellinen
Attorney—Arnold, Roylance, Kruger & Durkee ABSTRACT: An improvement in methods and apparatus for linearizing the output of a linear voltage differential transformer responsive to a nonlinear input motion by utilizing a variable resistor disposed across the output of the secondary coils of the transformer for adjusting the magnitude of the difference signal to a predetermined value and reduce the error in the signal to zero for a known displacement of the movable transformer core.

PATENTED AUG 17 1971
3,600,669
SHEET 1 OF 2

John T. McClain
INVENTOR

BY Arnold, Roylance,
Kruger & Durkee
ATTORNEYS

John T. McClain
INVENTOR

BY Arnold, Roylance,
Kruger & Durkee
ATTORNEYS

METHOD AND APPARATUS FOR LINEARIZING THE SIGNAL OUTPUT OF AN LVDT RESPONSIVE TO NONLINEAR INPUT MOTION

BACKGROUND OF THE INVENTION

There are many applications utilizing a linear voltage differential transformer (LVDT) for generating an electrical signal proportional to the displacement of the transformer core in response to an external physical motion. The electrical signal will vary linearly if the external physical motion, and hence the displacement of the transformer core is linear. Often it is desired that such external physical motion be linear, but due to mechanical limitations it is not. For example, the LVDT may be used in a differential pressure transducer system where the transformer core is connected to a conventional metal bellows and is displaced in response to bellows expansion or contraction as differential pressure is applied across the bellows. The objective is to obtain an electrical output signal that represents accurately and, therefore, linearly the differential pressure applied across the bellows. It is difficult and exceedingly expensive to manufacture a bellows whose motion is perfectly linear in response to an applied differential pressure. As a result, the electrical output signal proportional to the transformer core displacement and differential pressure will be in error, when compared with the actual differential pressure caused by the nonlinearity of the bellows as it fails to follow the actual differential pressure applied.

Another example of an application of the LVDT is in a static pressure transducer system, where an electrical output signal is obtained that is proportional to the static pressure applied to a Bourdon tube. The end of the Bourdon tube travels in a small arc approximately proportional to the magnitude of the static pressure applied to the tube. With the transformer core of the LVDT adapted for movement in response to the movement of the end of the Bourdon tube, the displacement of the transformer core approximates the change in pressure applied. The electrical signal output of the LVDT is approximately proportional to the amount of pressure applied to the Bourdon tube. Errors in the electrical signal output result from the imperfect representation of pressure changes by the nonlinear displacement of the end of the Bourdon tube, and hence the nonlinear displacement of the LVDT core.

In many application of the LVDT additional signal errors other than those mentioned above, are created due to the inherent imperfections of the transformer itself. There is some nonlinearity in the variation of the electrical output signal with the actual travel of the transformer core, i.e., if a perfectly linear motion is applied to the transformer core, an exact proportional representation of this motion in the electrical output signal is not always obtained.

To overcome the error due to the nonlinearity inherent in the LVDT and in the external motion-producing means, it is common to adjust the error to zero at the starting point of the motion, i.e., with the transformer core displaced to the electrical center of the LVDT, and at the maximum point of motion, i.e., with the transformer core displaced to its maximum point by the external motion-producing means. Such an adjustment insures that at a null or "zero" displacement and at maximum displacement of the transformer core the output signal proportional to the magnitude displacement will not be in error. However, in the intervening range of operation, error will result due to nonlinearity and often may be as much as 1 to 1.5 percent of full scale readings. In applications where extreme accuracy is required, such as in the measurement of various petroleum products, errors of 1 to 1.5 percent of full-scale readings are not acceptable.

Accordingly, the present invention remedies the problems of the prior art by providing an electrical circuit for linearizing the output of a LVDT having a nonlinear physical motion applied to its transformer core.

SUMMARY OF THE INVENTION

The instant invention provides a novel means of adjusting the electrical output signal of the LVDT to zero at a third point, resulting in greatly improved linearity of the output signal, whereby maximum error may be reduced to as little as 0.2 percent of full-scale readings. A variable resistive load is connected across the output of the secondary coils of the LVDT to provide a means of adjusting the error in the output signal proportional to the transformer core displacement to zero at the midpoint between the electrical center portion of the core and its maximum displacement.

More specifically, in a preferred embodiment of the present invention where an LVDT is utilized in a system for measuring pressures including an AC signal generator for applying an AC signal to the primary coil of the LVDT where varying AC signals, 180° out of phase, are induced in a pair of secondary coils in response to displacement of the transformer core due to pressure changes, means for rectifying the AC output signals of the pair of coils to produce a pair of DC signals of opposite polarity and varying magnitude, first and second load means for algebraically summing the pair of DC signals to produce a discrete DC difference signal approximately proportional to the magnitude of displacement of the transformer core, a variable resistive means is provided for operating in conjunction with the first and second load means for providing a means of simultaneously adjusting the magnitude of each one of the pair of DC signals of opposite polarity in order to adjust the magnitude of the discrete DC difference signal to a predetermined value at the midpoint of the transformer core displacement. Thereafter, operation of the LVDT will produce a discrete DC difference signal having a substantially linear variation over the full range of the transformer core displacement.

Utilizing the present invention, bellows that otherwise might be rejected due to inadequate linearity are acceptable with the same high degree of LVDT signal output linearity that would be produced by a painstakingly selected or more expensive bellows. Similarly, Bourdon tubes that may have been rejected due to inadequate accuracy may be utilized. It is apparent that the use of the instant invention will effect a significant savings in time and materials cost since less time will be needed to test the motion-producing means, such as bellows or a Bourdon tube, for linearity and less-expensive motion-producing means may be employed without sacrificing linearity.

Accordingly, one primary feature of the present invention is to provide a novel means for linearizing the output signals of an LVDT responding to nonlinear input motion.

Another feature of the present invention is to provide a novel variable resistive load for adjusting the output error signal of an LVDT to zero at a point between the electrical zero of the transformer and maximum displacement of the transformer core.

Yet another feature of the present invention is to provide a novel means for linearizing the output signals of an LVDT responding to nonlinear input motion and allowing the use of less expensive and nonlinear motion-producing means.

BRIEF DESCRIPTION OF THE DRAWINGS

In order that the manner in which the above-recited advantages and features of the invention are attained, as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings.

DETAILED DESCRIPTION OF THE PREFERRED EMBODIMENTS

Figure 1:
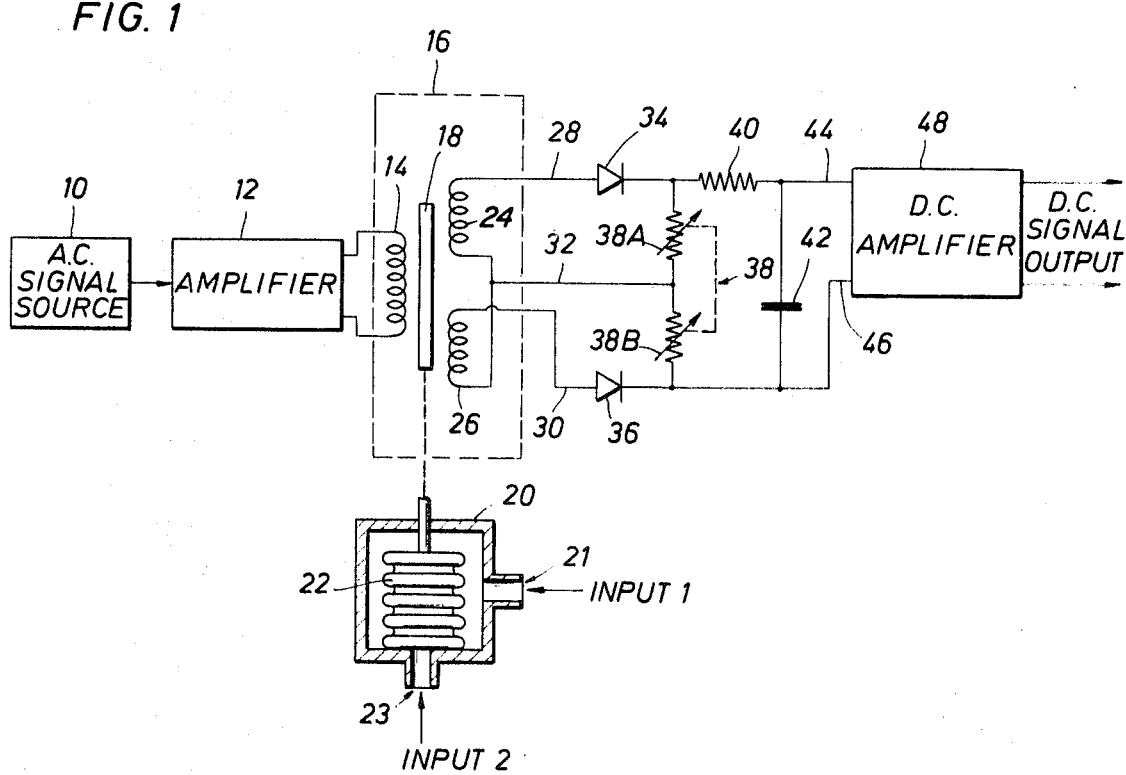
FIG. 1 is a schematic representation of a differential pressure-measuring system utilizing a LVDT and the linearizing circuit according to the present invention.

Referring now to FIG. 1, a pressure-measuring system utilizing a linear voltage differential transformer (LVDT) and the linearizing circuit according to the present invention is shown. An AC signal generator 10 applies an AC signal to an amplifier 12, which in turn applies the amplified AC signal to the primary coil 14 of LVDT 16. The LVDT has an internal movable transformer core 18 that is mechanically connected to a motion-producing means 20, represented here by a differential pressure transducer, employing a bellows element 22, and first and second pressure inlets 21 and 23, respectively, for applying the differential pressure across the bellows 22. The differential pressure acting on bellows 22 causes it to contract or expand, thereby displacing the mechanically connected transformer core 18.

The LVDT has a pair of secondary coils 24 and 26 that are interconnected so that the AC signals induced in each of the secondary coils, via coupling provided by transformer core 18 from the primary coil 14, are 180° out of phase. The AC signal induced in secondary coil 24 is applied via conductor 28 to the input of a diode stage 34. The AC signal induced in secondary coil 26, 180° out of phase with the AC signal induced in coil 24, is applied via conductor 30 to a diode stage 36. The diodes 34 and 36 serve as half-wave rectifiers, conducting during each half cycles, through their respective load resistors 38A and 38B, respectively. Conductor 32 connects the center tap between the secondary coils 24 and 26 to the common side of each of the load resistors 38A and 38B.

The transformer core 18 is shown in its center or null position, and therefore AC signals of equal magnitude will be induced in secondary coils 24 and 26. The two diode half-wave rectifiers, 34 and 36, will conduct equally during each half cycle of the applied 180° out of phase AC signals, producing equal DC voltages of opposite polarity applied across load resistors 38A and 38B, first and second load means respectively. The algebraic sum of the DC signals is therefore zero.

If transformer core 18 is moved away from the electrical center of the LVDT 16, the voltages induced into the secondary coils 24 and 26 will no longer be equal. For example, if bellows 22 expands, transformer core 18 is moved upwardly, and the coupling from the primary coil 14 to the secondary coil 24 increases, while the coupling between primary coil 14 and secondary coil 26 decreases. Therefore, the voltage developed across load resistor 38A will be greater than that developed across 38B, and the net output signal will be a positive discrete DC difference signal applied to the RC filter, comprising resistor 40 and capacitor 42, and via conductors 44 and 46 to the input of a DC amplifier 48. The amplifier DC signal output of amplifier 48 is applied to suitable receiving and/or recording and measuring equipment (not shown). The discrete positive DC difference signal developed across load resistors 38A and 38B is approximately proportional to the amount of displacement of the transformer core from electrical zero of the LVDT 16. The DC amplifier serves only to increase the magnitude of this DC voltage and to provide a useful output to the appropriate receiving apparatus.

As hereinbefore mentioned, it is common in the prior art to adjust the error of the discrete DC difference signal to zero when the transformer core 18 is in its null or zero position and at the point of maximum displacement of the transformer core 18 due to the maximum range of movement of the motion-producing means 20. The means for providing a third error adjustment point, thereby linearizing the discrete DC difference signal is accomplished by simultaneously increasing or decreasing the ohmic value of resistors 38A and 38B, ganged potentiometers functioning as variable resistive means. Since these resistors must be equal in value, as they act as load and a summing circuit, a single linearity control may be accomplished with a ganged potentiometer 38 where both resistor portions 38A and 38B will be varied simultaneously.

Figure 2:
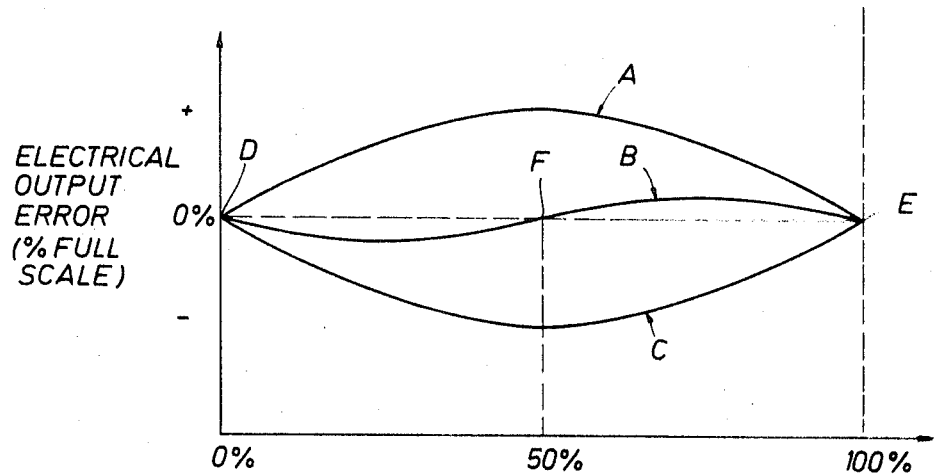
FIG. 2 is a graph showing the output error of the electrical signals as a percentage of full-scale reading plotted against the percentage of full range of motion imparted to the transformer core.

FIG. 2 is a graph showing the electrical output error as a percentage of full-scale reading plotted against the percentage of full range of movement produced by a motion-producing means and illustrates the improvement in linearity that may be achieved by utilizing the linearity circuit of the present invention, as compared to linearity adjustments of the prior art. Referring now to FIGS. 1 and 2, with transformer core 18 located in the electrical center of LVDT 16, the electrical output error is zero at a zero range of movement as shown at point D. At 100 percent of the full range of movement produced by the motion-producing means, transformer core 18 will be displaced a maximum distance, and the amplifier 48 may be adjusted to vary the amplified difference signal to agree with a predetermined value at the maximum displacement point, thereby zeroing the electrical output error as shown at point E. However, without some control and additional adjustment, the error between 0 percent and 100 percent of the full range of movement of transformer core 18 is uncontrollable and dependent on the accuracy of the LVDT and the linearity of the motion-producing means 20. However, by displacing transformer core 18 to a point corresponding to 50 percent of the maximum full range of movement that may be traversed by the motion-producing means, and by decreasing the value of resistors 38A and 38B by adjusting the ganged potentiometer 38, the positive discrete DC difference signal may be adjusted to coincide with a predetermined value exactly proportional to the magnitude of displacement of the transformer core 18. This adjustment of the discrete DC difference signal would bring the error at a 50 percent travel point to zero as shown at point F in the graph. Utilizing the error adjustment as provided by the instant invention, a resulting curve tracing the electrical output error of the LVDT will be as represented by curve B.

In a similar manner if the uncompensated error curve were shown by curve C, increasing the ohmic value of resistors 38A and 38B, by adjusting the ganged potentiometer 38, would cause the compensated error curve to pass through zero at the 50 percent travel point, and a much-improved linearity would result as shown in curve B. As hereinabove mentioned, the errors of a convention device, as represented by curves A and C may be as much as 1 percent to 1.5 percent of the full-scale reading at the maximum or 50 percent travel point. By utilizing the circuitry of FIG. 1, and appropriately adjusting the ohmic values of resistors 38A and 38B, the compensated error may be reduced to as little as 0.2 percent at the greatest point and to 0 percent at the 50 percent travel point. Of course, the adjusting point, utilizing the adjustment of the gain of the amplifier 48 may be made at some point other than 100 percent of travel, for example 80 percent, 9. percent, etc., but error will result at the 100 percent point and between zero travel and the selected adjustment point whether it be 80 percent, 90 percent or some other value. At best, the total error is a compromise over a limited range of operation. With the circuitry described in FIG. 1, three points of adjustment are obtained, namely at 0 percent, 50 percent and 100 percent of the full range of movement within the capability of the motion-producing means, resulting in a dramatically improved linearity of the output signals.

Figure 3:
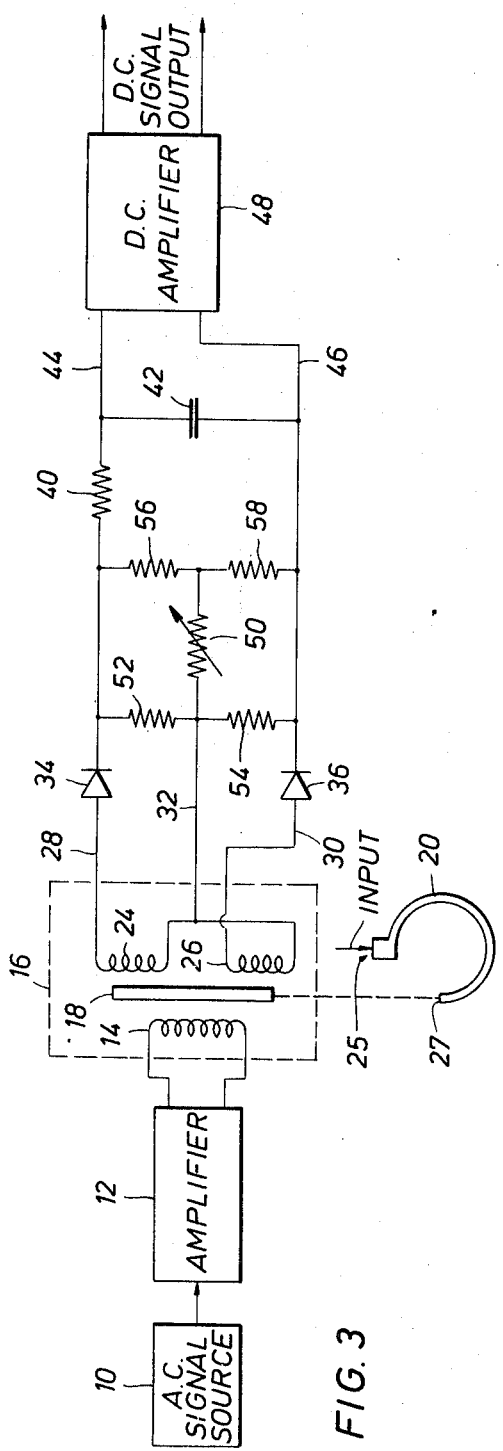
FIG. 3 is a schematic representation showing a pressure-measuring system utilizing an LVDT and a second embodiment of the present invention.

In FIG. 3, a second embodiment of the present invention is shown. An AC signal source and amplifier provide an AC signal to the primary coil 14 of an LVDT 16 as hereinabove described for the embodiment illustrated in FIG. 1. Similarly, the transformer core 18 is mechanically connected to motion-producing means 20, which in FIG. 3 is representatively illustrated by use of a Bourdon tube, the closed end 27 of which is mechanically coupled to transformer core 18. The Bourdon tube 20 is generally used to measure static pressures, which are applied as an input at inlet 25, and as the end 27 of the Bourdon tube moves in response to the applied pressure the mechanically coupled transformer core 18 is displaced. Displacement of the transformer core 18 induces 180° out of phase AC signals in secondary coils 24 and 26, as hereinabove described, and are applied via connectors 28 and 30 to diode half-wave rectifiers 34 and 36, respectively producing DC signals of opposite polarity as hereinabove described for the circuit illustrated in FIG. 1. However, the resistive load and summing circuit is made up of series-disposed resistors 52 and 54 in parallel with resistors 56 and 58. The common junction of resistors 52 and 54 and resistors 56 and 58 are interconnected together and to the center tap of the secondary coil of LBDT 16. Resistor pairs 52 and 56 and 54 and 58 form first and second load means for receiving the outputs DS signals of diodes 34 and 36, respectively. A variable resistor 50, or variable resistive means, is connected between the common junction of resistors 52 and 54 and resistors 56 and 58. To provide identical loading for each DC signal, the value of resistor 52 must be equal to the value of resistor 54, and similarly the value of resistor 56 must be equal to the value of resistor 58. The ohmic value of resistor 50 can be any value depending on the range of adjustment desired as hereinafter described.

Referring now to FIGS. 2 and 3, with variable resistor 50 set at its maximum value, the net load resistance on the output of the LVDT 16 and the rectifiers 34 and 36 is maximum and the resulting error due to nonlinearity of the motion-producing means curve 20 and the LVDT itself will be positive as shown by A in FIG. 2. By decreasing the value of resistor 50, the total load resistance is decreased and the error curve may be changed to a negative curve as shown at C in FIG. 2. Specifically, if the uncompensated error is positive at the 50 percent point of maximum travel, as shown in curve A, decreasing the ohmic value of resistor 50 will adjust the magnitude of the DC difference signal to a predetermined value for the midpoint of travel, thereby adjusting the error at the midpoint to zero and causing the compensated error curve to pass through zero at the 50 percent point, as shown by curve B at point F.

Likewise, if the uncompensated error curve is negative, as shown by curve C in FIG. 2, increasing the ohmic value of variable resistor 50 will reduce the error at the 50 percent point of travel to zero, and cause the compensated error curve to pass through the zero error point F at the 50 percent point of travel and result in a highly improved output linearity described by curve B. The discrete DC difference signal from the output of the resistive load is applied to an RC filter network and as an input to a DC amplifier 48, for the identical purposes as hereinabove described for the circuit as shown in FIG. 1.

Figure 4:
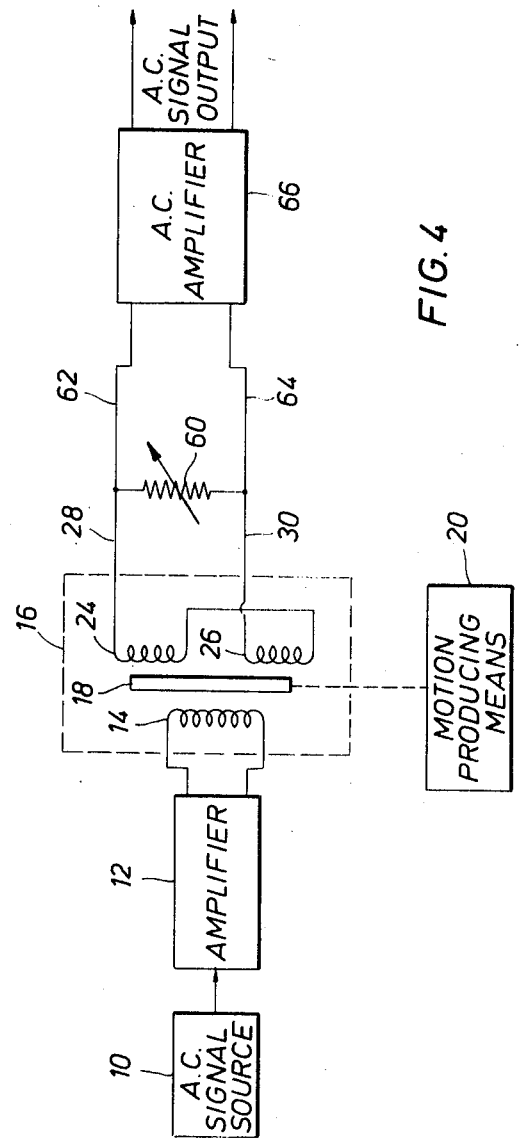
FIG. 4 is a schematic representation of a third embodiment of the present invention utilized for linearizing an AC output signal of an LVDT circuit.

FIG. 4 illustrates a third embodiment of the present invention utilized in a circuit where the desired output is an AC voltage proportional to the motion imparted to the transformer core, instead of a DC voltage as hereinabove described for embodiments shown in FIGS. 1 and 3. An LVDT 16 is shown having its transformer core 18 mechanically connected to a motion-producing means 20. Means for providing an AC signal to the primary coil of the LVDT are shown that are identical to the means above described in the previous embodiments. AC signals are induced in secondary coils 24 and 26 and applied via conductors 28 and 30 to a variable load resistor 60 and thence via conductors 62 and 64 as an input to an AC amplifier 66 for amplification and application to appropriate receiving and/or recording measuring equipment (not shown). Variable resistor 60 provides for error control in this embodiment.

The electrical output error may be adjusted to zero at the midpoint of travel of the motion-producing means 20 to achieve a compensated error curve as shown at curve B in FIG. 2. However, there is one difference in the adjustment of the AC difference signal utilized in the circuit shown in FIG. 4, as contrasted with the adjustment of the DC difference signals described hereinabove. Increasing the value of resistor 60 moves the error curve in a negative direction and decreasing the ohmic value of variable resistor 60 moves the error curve in a positive direction, contrary to the adjustments hereinabove described in the prior two embodiments.

Of course, as hereinabove described, in connection with the circuit illustrated in FIG. 1, other maximum adjusting points may be made at any preselected percentage of the full-range travel produced by the motion-producing means, such as 80 percent, 90 percent, etc. However, as hereinabove described, error will result at the 100 percent point and between 0 percent and the preselected adjustment point. At best, the total error is a compromise over a limited range of operation, and utilizing the linearity adjusting circuit described herein, a greatly improved linearity of the output signals proportional to a displacement of the transformer core may be achieved.

Numerous variations and modifications may obviously be made in the structure herein described without departing from the present invention. Accordingly, it should be clearly understood that the forms of the invention herein described and shown in the figures of the accompanying drawings are illustrative only, and are not intended to limit the scope of the invention.

What I claim is:

1. In apparatus for producing a linear output signal in response to a nonlinear physical motion applied to a linear voltage differential transformer having a primary coil, a pair of secondary coils and a movable transformer core coupling said primary and secondary coils, the improvement in combination therewith comprising an AC signal source for applying an AC signal to the primary coil of the transformer to induce first and second 180° out-of-phase AC signals in respective ones of the secondary coils, the magnitude of said induced AC signals varying in response to the change in coupling between the primary and secondary coils as the transformer core is displaced in response to the applied nonlinear motion, first load means for receiving said first 180° out-of-phase AC signal, second load means for receiving said second 180° out-of-phase AC signal, said first and second load means cooperating to produce a difference signal representative of the amount of displacement of the transformer core, and variable resistive means cooperating with said first and second load means for simultaneously varying each of said means for adjusting the magnitude of said differences signal to a predetermined value directly proportional to a known displacement of the transformer core at a known point between the maximum extremes of the nonlinear physical motion.

2. The improvement apparatus as described in claim 1, wherein said first load means includes a first diode for rectifying said first AC signal to produce a first DC signal of a first magnitude and known polarity, and a first resistive element disposed between the output of said first diode and the center tap of the secondary coils to develop a first DC voltage across said first resistive element of known magnitude and polarity.

3. The improvement apparatus as described in claim 2, wherein said second load means includes a second diode for rectifying said second AC signal 180° out of phase with said first AC signal to produce a second DC signal of a second magnitude and of opposite polarity to said first DC signal, and a second resistive element disposed between the output of said second diode and the center tap of the secondary coils to develop a second voltage across said second resistive element of known magnitude and a polarity opposite to the polarity of said first voltage, said first and second resistive elements being in a series relationship for algebraically summing said first and second DC signals for producing a discrete DC difference signal.

4. The improvement apparatus as described in claim 3, wherein said variable resistive means comprises a ganged potentiometer including said first and second resistive elements of said first and second load means, said first and second resistive elements being simultaneously variable to change said first and second resistive elements in equal increments for varying the resistive load across the outputs of said first and second diodes to adjust the magnitude of said discrete DC difference signal.

5. The improvement apparatus as described in claim 1, wherein said first and second load means include
a first diode for rectifying said first AC signal to produce a first DC signal of a first magnitude and known polarity,
a second diode for rectifying said second AC signal 180° out of phase with said first AC signal to produce a second DC signal of a second magnitude and of opposite polarity to said first DC signal,
a first resistive element disposed between the outputs of said first and second diodes, said first resistive element being equally divided into first and second equal resistors in series, the common connection between said first and second resistors being connected to the center tap of the secondary coils,
a second resistive element disposed between the outputs of said first and second diodes and connected in parallel with said first resistive element, said second resistive element being equally divided into third and fourth equal resistors in series, the common connection between said third and fourth resistors being connected to the common connection between said first and second resistors,
said first and third resistors forming a third resistive element for cooperating with said first diode to comprise said first load means, and said second and fourth resistors forming a fourth resistive element for cooperating with said second diode to comprise said second load means, said third and fourth resistive elements being in a series relationship for algebraically summing said first and second DC signals for producing a discrete DC difference signal.

6. The improvement apparatus as described in claim 5, wherein said variable resistive means comprises a variable resistor interconnecting said common connections between said first and second resistors with said common connection between said third and fourth resistors, said variable resistor being variable to simultaneously change the resistance of said third and fourth resistive elements of said first and second load means in equal increments for simultaneously varying the resistive load across the outputs of said first and second diodes to adjust the magnitude of said discrete DC difference signal.

7. The improvement apparatus as described in claim 1, wherein said first and second load means and said variable resistive means comprise a variable resistor interconnected across the output of said pair of secondary coils for algebraically summing said first and second 180° out of phase AC signals for producing a difference signal representative of the amount of displacement of the transformer core, and for adjusting the magnitude of said difference signal to a predetermined value directly proportional to a known displacement of the transformer core at a known point between the maximum extremes of the nonlinear physical motion.

8. In apparatus for producing a linear output signal in response to a nonlinear physical motion applied to a linear voltage differential transformer having a primary coil, a pair of secondary coils and a movable transformer core coupling said primary and secondary coils, the improvement in combination therewith comprising
an AC signal source for applying an AC signal to the primary coil of the transformer to induce first and second 180° out of phase AC signals in respective ones of the secondary coils, the magnitude of said induced AC signals varying in response to the change in coupling between the primary and secondary coils as the transformer core is displaced in response to the applied nonlinear motion,
a first diode for rectifying said first AC signal to produce a first DC signal of a first magnitude and known polarity,
a second diode for rectifying said second AC signal 180° out of phase with said first AC signal to produce a second DC signal of a second magnitude and of opposite polarity to said first DC signal,
a first resistive element disposed between the outputs of said first and second diodes, said first resistive element being equally divided into first and second equal resistors in series, the common connection between said first and second resistors being connected to the center tap of said secondary coils,
a second resistive element disposed between the outputs of said first and second diodes and connected in parallel with said first resistive element, said second resistive element being equally divided into third and fourth equal resistors in series, and
a variable resistor interconnecting said common connections between said first and second resistors with said common connection between said third and fourth resistors,
said first, third and variable resistors forming a third resistive element and said second, fourth and variable resistors forming a fourth resistive element, and third and fourth resistive elements being in a series relationship for algebraically summing said first and second voltages for producing a discrete DC difference signal, and said variable resistor being variable to simultaneously change the resistance of said third and fourth resistive elements in equal increments for varying the resistive load across the outputs of said first and second diodes to adjust the magnitude of said discrete DC difference signal.

9. A method of generating a linear output signal in response to a nonlinear physical motion comprising the steps of
generating an AC signal,
applying said AC signal to the primary coil of a linear voltage differential transformer,
displacing the movable core of said linear voltage differential transformer in response to said nonlinear physical motion for inducing discrete AC signals in a pair of secondary coils of said linear voltage differential transformer, said induced AC signals being 180° out of phase and of varying magnitudes one to the other,
rectifying each of said pair of 180° out of phase AC signals to produce first and second discrete DC signals of opposite polarity and varying magnitude,
algebraically summing said first and second discrete DC signals for producing a discrete DC difference signal approximately proportional to the displacement of said transformer core,
amplifying said discrete DC difference signal to produce an amplified difference signal for application to suitable receiving equipment for indicating said transformer core displacement,
displacing said transformer core to the electrical center of said linear voltage differential transformer for producing a pair of discrete DC signals of opposite polarity and equal magnitude,
displacing said transformer core in response to the maximum travel of the nonlinear physical motion for producing a discrete DC difference signal at said maximum displacement,
adjusting the amplification of said discrete DC difference signals at said maximum displacement to produce a difference signal of a predetermined value directly proportional to the maximum displacement of said transformer core, displacing said transformer core to a position midway between said electrical center and said maximum displacement, and adjusting the magnitude of said discrete DC difference signal to a predetermined value proportional to the actual displacement of said transformer core at said midway point for producing a substantially linear change in said discrete DC difference signal during displacement of said transformer core over the full range of the nonlinear physical motion.

10. In apparatus for producing a linear output signal in response to a nonlinear physical motion applied to a linear voltage differential transformer having a primary coil, a pair of secondary coils and a movable transformer core coupling said primary and secondary coils, the improvement in combination therewith comprising an AC signal source for applying an AC signal to the primary coil of the transformer to induce first and second 180° out of phase AC signals in respective ones of the secondary coils, the magnitude of said induced AC signals varying in response to the change in coupling between the primary and secondary coils as the transformer core is displaced in response to the applied nonlinear motion, a first diode for rectifying said first AC signal to produce a first DC signal of a first magnitude and known polarity, a second diode for rectifying said second AC signal 180° out of phase with said first AC signal to produce a second DC signal of a second magnitude and of opposite polarity to said first DC signal, a first potentiometer disposed between the output of said first diode and the center tap of the secondary coils to develop a first DC voltage across said first potentiometer of known magnitude and polarity, and a second potentiometer disposed between the output of said second diode and the center tap of the secondary coils to develop a second DC voltage across said second potentiometer of known magnitude and a polarity opposite to the polarity of said first voltage, said first and second potentiometers commonly interconnected to the center tap of the secondary coils to form a series relationship for algebraically summing said first and second DC voltages for producing a discrete DC difference signal, said first and second potentiometers being ganged together for allowing simultaneous variation of said first and second potentiometers in equal increments for varying the resistive load across the outputs of said first and second diodes to adjust the magnitude of said discrete DC difference signal.

PO-1050
(5/69)

UNITED STATES PATENT OFFICE
CERTIFICATE OF CORRECTION

Patent No. 3,600,669                    Dated August 17, 1971

Inventor(s) John T. McClain

It is certified that error appears in the above-identified patent and that said Letters Patent are hereby corrected as shown below:

Column 4, line 51, "convention" should read -- conventional --;
         line 61, "9." should read -- 90 --.
Column 5, line 18, "LBDT" should read -- LVDT --;
         line 19, "outputs" should read -- output --.

Signed and sealed this 29th day of February 1972.

(SEAL)
Attest:

EDWARD M. FLETCHER, JR.                ROBERT GOTTSCHALK
Attesting Officer                      Commissioner of Patents